(12) United States Patent
Kossanyi

(10) Patent No.: US 12,275,225 B2
(45) Date of Patent: Apr. 15, 2025

(54) SANDWICH PANEL FOR A CAR ABLE TO CARRY A LOAD

(71) Applicant: Autoneum Management AG, Winterthur (CH)

(72) Inventor: Mathias Kossanyi, Paris (FR)

(73) Assignee: Autoneum Management AG, Winterthur (CH)

( * ) Notice: Subject to any disclaimer, the term of this patent is extended or adjusted under 35 U.S.C. 154(b) by 686 days.

(21) Appl. No.: 17/420,695

(22) PCT Filed: Jan. 9, 2020

(86) PCT No.: PCT/EP2020/050388
§ 371 (c)(1),
(2) Date: Jul. 5, 2021

(87) PCT Pub. No.: WO2020/148152
PCT Pub. Date: Jul. 23, 2020

(65) Prior Publication Data
US 2022/0097341 A1     Mar. 31, 2022

(30) Foreign Application Priority Data
Jan. 16, 2019    (EP) .................................. 19152040

(51) Int. Cl.
*B32B 5/26*       (2006.01)
*B32B 5/02*       (2006.01)
(Continued)

(52) U.S. Cl.
CPC .............. *B32B 5/262* (2021.05); *B32B 5/022* (2013.01); *B32B 5/026* (2013.01); *B32B 5/028* (2013.01);
(Continued)

(58) Field of Classification Search
CPC ........ B32B 2260/046; B32B 5/28; B32B 3/12
See application file for complete search history.

(56) References Cited

U.S. PATENT DOCUMENTS 4,374,885 A * 2/1983 Ikeda .................. B29C 44/5618
428/317.9
4,374,935 A * 2/1983 Decker .............. C08G 18/4018
521/914

(Continued)

FOREIGN PATENT DOCUMENTS

EP       0008960 A2    3/1980
EP       0320042 A1    6/1989

OTHER PUBLICATIONS

International Search Report from parent PCT/EP2020/050388. 5 pages. Jul. 23, 2020.
(Continued)

*Primary Examiner* — Humera N. Sheikh
*Assistant Examiner* — Julia L Rummel
(74) *Attorney, Agent, or Firm* — FisherBroyles, LLP; Craig W. Mueller

(57) ABSTRACT

Sandwich panel for use in a vehicle comprising at least a core layer and two fibrous layers in contact with and firmly connected to the core layer, both sides being impregnated with polyurethane whereby the polyurethane is embedding the fibers and binding to the board material, and whereby the sandwich panel further comprises at least a polyether polyurethane foam layer fully impregnated with polyurethane and in contact and firmly connected to the outer surface of at least one fibrous layer by the polyurethane, and a skin layer on the outer surface of the polyether polyurethane foam not in contact with the fibrous layer consisting of compressed polyurethane.

18 Claims, 3 Drawing Sheets

(51) Int. Cl.
   *B32B 5/18*     (2006.01)
   *B32B 5/24*     (2006.01)
   *B32B 15/14*    (2006.01)
   *B32B 27/06*    (2006.01)
   *B32B 3/12*     (2006.01)
   *B32B 9/04*     (2006.01)

(52) U.S. Cl.
   CPC ............... *B32B 5/18* (2013.01); *B32B 5/245* (2013.01); *B32B 15/14* (2013.01); *B32B 27/065* (2013.01); *B32B 3/12* (2013.01); *B32B 9/046* (2013.01); *B32B 2260/023* (2013.01); *B32B 2260/046* (2013.01); *B32B 2262/0253* (2013.01); *B32B 2262/0269* (2013.01); *B32B 2262/0276* (2013.01); *B32B 2262/065* (2013.01); *B32B 2262/08* (2013.01); *B32B 2262/101* (2013.01)

(56) References Cited

U.S. PATENT DOCUMENTS

| | | | | |
|---|---|---|---|---|
| 4,997,707 | A  * | 3/1991 | Otawa | B32B 27/065 428/319.3 |
| 2009/0047465 | A1* | 2/2009 | Zafiroglu | B32B 3/30 428/85 |
| 2011/0262703 | A1* | 10/2011 | Legler | B32B 15/18 156/182 |
| 2016/0002495 | A1* | 1/2016 | Kwon | C08G 18/48 252/62 |
| 2017/0095997 | A1* | 4/2017 | Dodworth | B32B 3/12 |
| 2018/0127987 | A1* | 5/2018 | Bradway | D06N 7/0076 |

OTHER PUBLICATIONS

Written Opinion from parent PCT/EP2020/050388. 5 pages. Jul. 23, 2020.

* cited by examiner

SANDWICH PANEL FOR A CAR ABLE TO CARRY A LOAD

This application is a national stage application under 35 U.S.C. 371 and claims the benefit of PCT Application No. PCT/EP2020/050388 having an international filing date of Jan. 9, 2020, which designated the United States, which PCT application claimed the benefit of European Patent Application No. 19152040.2 filed Jan. 16, 2019, the disclosure of each of which are incorporated by reference herein.

TECHNICAL FIELD

The invention is directed to a sandwich panel for cars able to carry a load, like battery electric vehicles, personal cars or small transport vans, a method of producing such a part and the use of such a panel in a car.

BACKGROUND ART

Personal cars and small transport vehicles may have a trunk or comparable area where goods can be loaded and transported. The flooring panel used in such area must be able to carry high loads. Conventionally these panels are produced as sandwiched panels with a stiff core and skin layers to enhance the bending stiffness.

The three-layer sandwich construction is preferred for use in automotive lightweight engineering where flat and shell-shaped panels are required to withstand high bending loads. In this construction the upper and lower facings are made up of a fiber reinforced composite which is responsible for the flexural strength of the compound and is capable of withstanding the pressure and tensile stresses that arise. The fibers act as a reinforcing component and are connected to each other by means of a fabric construction or a bonded web.

Polyurethane (PU) is often used for fixing the glass fiber mat which, because of its controllable foaming properties, also benefits lightweight construction. The PU matrix, in addition to fixing the glass mat, may be at the same time responsible for binding the honeycomb core to the facings in a sandwich construction.

An example of such a sandwich load floor panel according to the state of the art, as for instance disclosed in EP1609576, is having a cardboard honeycomb core and glass fiber mat skins, whereby the core and glass mats are combined by impregnation with a reactive polyurethane mixture. The polyurethane wetted layers are placed in a mold and compression molded into the required shape. During this molding step the polyurethane reacts by forming foam thereby increasing the pressure inside the closed mold. The impregnated foam binds the layers together. This gives a sturdy load floor, with a bad appearance. Although the fibers are embedded in the foam they are still visible on the surface.

A big disadvantage of the current process is that the pressure forces the polyurethane material inside the honeycomb rather than filling surface embellishment or formed cavities within the mold surface to give the desired surface appearance and texture. Also the gas produced during the foaming process will form bubble defects on the surface of the part produced. Obtaining a good definition of surface features like ribs, designs in the form of wood grain or leather embossments or beading on the surface of the part is therefore not possible. Hence, in practice these load floors are covered with an aesthetic layer like a carpet for the used or visible surface, called A-surface, and left with a bad back surface called B-surface.

In some cars it is foreseen to turn the load floor to the B-surface if a load is carried that might damage or soak the A surface, in particular for wet loads or loads with a likelihood of liquid spilling. Although the glass fibers in the B-surface are initially protected, harsh usage might damage the foam embedding, for instance by scratches, and glass-fiber-ends might stick out of the surface being a hazard, making the B-surface even worse.

Adding additional layers on the B-surface might give a better appearance but will increase the weight of the final part as well as increase the complexity of the production process.

It is the object of the invention to optimize the sandwich panel of the state of the art, particularly to obtain a more versatile light weight alternative to the current load floor as well as the way to produce such a panel without the known drawbacks as discussed.

SUMMARY OF INVENTION

This object is achieved by a sandwich panel with the features of claim 1, by a method of producing such a panel with the features of claim 16 and by the use of such a panel according to claim 17.

It is one aspect of embodiments of the present invention to provide a sandwich panel for use in a vehicle comprising a core layer covered on both sides with fibrous layers (7) that are covered with a polyether polyurethane resilient slab foam layer, wherein the polyether polyurethane resilient slab foam layer is covered with a wet polyurethane foam that is compressed to impregnate fibers in the fibrous layer with the wet polyurethane foam, which binds the fibrous layers (7) to the core material without fully filling the core layer structure with wet polyurethane foam. Accordingly, the polyurethane resilient slab foam layer is fully penetrated with polyurethane. A skin layer formed of compressed wet polyurethane foam is located on the outer surface of the polyether polyurethane resilient slab foam layer, wherein the skin layer does not contact the fibrous layer. Further, this embodiment possesses a bulge inside the core layer that binds the adjacent layers to the core layer without fully filling the core layer structure.

Surprisingly by using a polyether polyurethane resilient foam layer on top of the fibrous layer before wetting with the polyurethane foam mixture results in a good fixation of all layers together reducing the amount of foam in the core layer structure and increasing the surface definition. In addition, the scratch resistance could be increased. The combination of high resilient polyether polyurethane foam with a dense open cell structure seems to work as a polyurethane foam guide or resistance for the foam flow during the compression molding of the part. However, the structure is initially open enough to obtain a good penetration of the polyurethane foam through the polyether-polyurethane slab foam layer and fibrous layer and on the contact surface between the core layer and the fibrous layers ensuring an even binding of all layers. In addition, the foam enables a better filling of the surface structure in the mold, enhanced by the pressure and temperature of the mold a thick scratch resistant and even skin layer is formed on the part surface.

Preferably resilient polyurethane slab foam based on polyether polyol is used. For instance, slab foam produced from a polyether polyol and an isocyanate TD80, both might be optionally modified. Additional additives like catalysts, stabilizers, dyes or flame retardants might be added where deemed necessary. As a catalyst an amine catalyst might be used.

Alternatively combustion modified conventional polyether polyurethane foam might be used, for instance a flexible polyether polyurethane foam as promoted by Recticel®. These foams are normally used in the upholstery and furniture market and less known in the automotive field of trim parts and cladding structures.

Preferably, the polyether polyurethane foam has a net density of between 20 to 26 kg/m3.

Preferably, the polyether polyurethane foam layer is having a surface weight of between 48 to 240 gsm, preferably between 72 and 192 gsm.

Surprisingly, already a thin layer of the polyether-polyurethane foam, with a thickness of between 2 to 10 mm, preferably between 3 to 5 mm is enough to obtain the desired effect of having a better polyurethane wetting and impregnation distribution flow over the covering layers of the sandwich stack and inside the 3D surface features.

Preferably the foam is resilient and has a 40% compression resistance of between 5.0-6.5 kPa as measured with ISO3386.

The impregnation of the polyether-polyurethane slab foam and underlying fibrous layer is obtained by wetting the layers with a polyurethane mixture; this is preferably achieved by spraying of the mixture. Either the spray head or the part to be wetted can be moved to obtain an even spreading of the mixture. Preferably higher amounts of mixture can be applied locally to strengthen areas or in areas with an increased thickness and or increased 3D definition or requirement.

To obtain a strong sandwich both sides of the sandwich stack are wetted.

As a wetting polyurethane mixture a mixture of polyol and isocyanate can be used that is premixed just before application. Preferably, it enfolds its full foam potential when the wetted layers are placed in the heated tool such that the pressure of the closed tool and the temperature together enables an even distribution throughout all layers and into the surface details.

The polyurethane forming mixture generally used in the process of the present invention will generally include:
- at least one polyol component with an average OH number of 300 to 700 which includes at least one short chain and one long chain polyol, the individual polyols having a functionality of 2 to 6;
- at least one isocyanate;
- optionally a blowing agent;
- an activator;
- optionally auxiliary substances, mould release agent and additives.

Suitable polyols can be polyester or polyether based.

U.S. Pat. No. 808,485 discloses preferred mixtures for wetting the polyether and fibrous layers comprising an isocyanate component and a polyol component comprising one or more natural oil based polyols, which might be used with the invention according to this application.

Preferably, the polyurethane foam used for wetting has an area weight of between 200 and 2000 gsm. In case one surface is covered with a carpet or other layer different amounts for the wetting of the A- and B-surface might be used, for example 600 gsm for the A-surface with the carpet and 1400 gsm for the B-surface with the embellishments.

Preferably, the reaction speed is optimal at a temperature of 130° C. The temperature condition of the mold is adapted accordingly.

Preferably, a first and second fibrous mat is used to cover both sides of the core structure and function as reinforcing layers. The first and second fibrous mat is preferably the same however can be made up of different fibers, fiber mixtures or fibrous layers.

Preferably the first and or second fibrous mat comprises at least one of inorganic fibers, for instance glass, carbon, basalt or aramid fibers, synthetic fibers such as for instance polyester, polyolefin for instance polyethylene or polypropylene, or polyamide fibers, organic regenerated fibers, for instance viscose, rayon, or modal fibers, natural fibers such as for instance hemp, flax, kenaf, bamboo or other cellulose fibers, animal fibers such as for instance wool fibers or any possible mixture with these fibers. The fibers can be from virgin, recycled or reclaimed origin.

Preferably a glass fiber mat or a mat comprising glass fibers is used as this increases the bending stiffness.

With fibers both endless filaments and cut filaments forming staple fibers are meant to be within the scope of the current invention.

The mat preferably has an area weight of between 100 and 900 gsm without the foam impregnation.

Preferably, the core layer is a spacer board with a honeycomb, corrugated or tubular grit structure or a closed cell foam structure.

The thickness of the core layer is between 2 and 30 mm, preferably between 5 and 20 mm, preferably the thickness is variable.

As a preferred core layer a board type material may be used that provides a bi-directional support, preferably having open cells mainly in the thickness direction of the plate, for instance tubular, corrugated or honeycomb type boards.

Preferably the core layer is made from plastic, for instance one of polyester, like polyethylene terephthalate (PET) or polybutylene terephthalate (PBT), polyamide, or a polyolefin type, like polypropylene or polyethylene, a polylactic based material, Polyether ether ketone (PEEK), polycarbonate or a natural material like paper or cardboard or from an inorganic material like for instance aramid or from combination of natural fibers and a resin or a metal like for instance aluminum.

The starting material might be folded in an expandable form to reduce storage before production. Hence the folded form is expanded and set before the production of the automotive part.

A cardboard honeycomb is preferred as this is foldable, light weight and cost effective. The cardboard must be strong enough to withstand the pressure during production. Preferably a paper weight of between 70 and 140 gsm is used.

Preferably the honeycomb used has cells with a diameter between 4 and 10 mm, preferably between 6 and 8 mm. The cell diameter may be decided on based on the final load requirements, the scratch resistance and 3D design of the top surface and may vary with paper weight and board thickness used.

Decreasing the cell diameter of the honeycomb will result in a more stable and stiff part. Surprisingly also the 3D definition of the surface as well as the scratch performance is enhanced, as the polyurethane foam is more compressed and the skin becomes denser.

Alternatively a polyester, polypropylene, polyethylene or aramid honeycomb with similar dimensions may be used.

In a preferred solution, stiff closed cell foam preferably polyester closed cell foam is used as the core layer.

The impervious polyester foam core layer has a compression modulus, measured according to ISO 844, of at least about 30 MPa, preferable minimum of 55 MPa.

Polyester foam according to the invention as claimed is based on thermoplastic polyester resin and preferably made of a foam-able grade of semi crystalline polyethylene terephthalate (PET). As they are melt extruded with a suitable chemical or physical blowing agent, these thermoplastic polyester resins yield closed-cell foams. The foam can be produced by recycled polyester or virgin raw material or a combination of both. Within the scope of the present invention polyester, in particularly polyethylene terephthalate, foam as core layer is not including polyester based polyurethane (PUR) foam.

The closed cell PET foam layer has a density of 60 to 200 Kg/m3, preferably 75 to 120 Kg/m3.

After molding additional layers might be laminated on at least one surface, for instance one chosen from a tufted carpet, a nonwoven carpet, knitted layer, foil layer, foamed, spray or RIM skin layer, a foil, a film or a scrim layer. Also cameos can be laminated only locally like patches or logos to further enhance aesthetics or function, like anti sliding pads.

Carpet or other textile surface coverage might be glued or laminated to recesses in the side of the panel to obtain a flush and nice finish of the part.

Preferably an additional surface layer is added to at least one of the surfaces, fully or partially covering that surface using in mold coating. Examples of such in mold coating can be local logos or text, or technical coatings for instance to render the part impervious to water or grease, to obtain a thermal conductive, electro conductive or electro-magnetic shielding layer on at least one of the surfaces.

Preferably a reversible panel is created with at one surface a carpet type layer and on the other surface a surface according to the invention with optionally a surface pattern, ribbing or a raised rim to further enhance the functionality of the that layer. Also drainage holes or guiding ribs might be integrated to drain spilled liquid in case the panel is used as a horizontal load bearing board for instance a floor board, load floor or battery cover.

Further features might be incorporated in the panel, directly during the compression molding or after the compression molding, for instance clips, mounting appliances, handles, nuts, brackets or reinforcement bars etc. These appliances are preferably made of polyamide or polyester, metal. Optionally carbon or glass fiber reinforced materials might be used.

A process for the production of the sandwich panel according to the invention comprising:

wetting a sandwich stack comprising at least one core layer and two fibrous layers in contact with the surfaces of the core layer on both sides with a polyurethane forming mixture which includes a foam stabilizer;
placing the wetted sandwich stack in a compression mold closing the mold and maintaining the mold at a temperature in the range between 40° and 200° C. to mold the part and to harden the polyurethane foam forming mixture and thereby forming a molded part, whereby the polyurethane is embedding the fibers and binding to the core layer; removing the molded article from the mold, characterized in that the sandwich stack further comprises at least a polyether slab foam layer covering the outer surface of a fibrous layer and whereby on that side the polyurethane mixture is applied on top of the polyether polyurethane foam surface and the polyurethane is penetrating the slab foam layer as well as the fibrous layer and binding to the core layer and whereby during the compression of the stack in the close mold a polyurethane skin is formed on top of the polyether polyurethane foam surface not in contact with the fibrous layer.

The process might further include the step of in mold coating an additional layer on top of the skin layer.

The process might further include the step of laminating additional layers on the skin layer after the thermo compression molding step, advantageously the rest heat available in the part is used to enable an easy laminating step.

Also normal cutting and finishing steps might be added to the process where necessary.

Use of the floor panel according to the invention as a load floor panel, a main floor panel for a passenger compartment, as roof module, bonnet, tailgate module, door module, floor panel module, parcel shelf, spare wheel cover, interior trim component, as a battery or battery pack cover, as a computer or battery box or as a partitioning panel.

DETAILED DESCRIPTION

Figure 1:
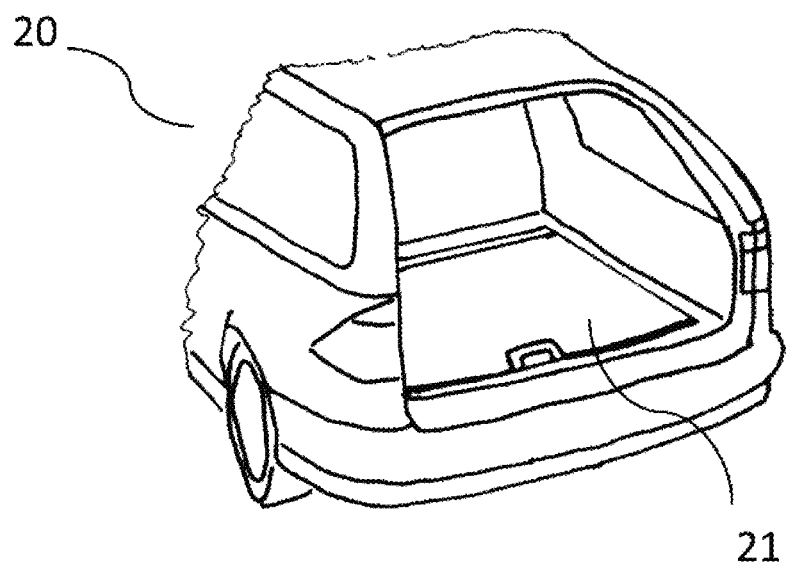
FIG. 1 Schematic figure of a car with an example of a part that can be produced according to the invention.

FIG. 1 shows partially a personal vehicle back area 20, with a load floor that might be produced according to the invention. The load floor can be designed with at least one surface according to the invention, preferably with both surfaces according to the invention. Preferably the load floor is designed such that it can be reversed between an A side and a B side, being the opposite surfaces on the load floor panel, whereby one side might be equipped with a carpet type surface for instance a tufted carpet or a nonwoven carpet and the other side might have a bare surface according to the invention.

Figure 2:
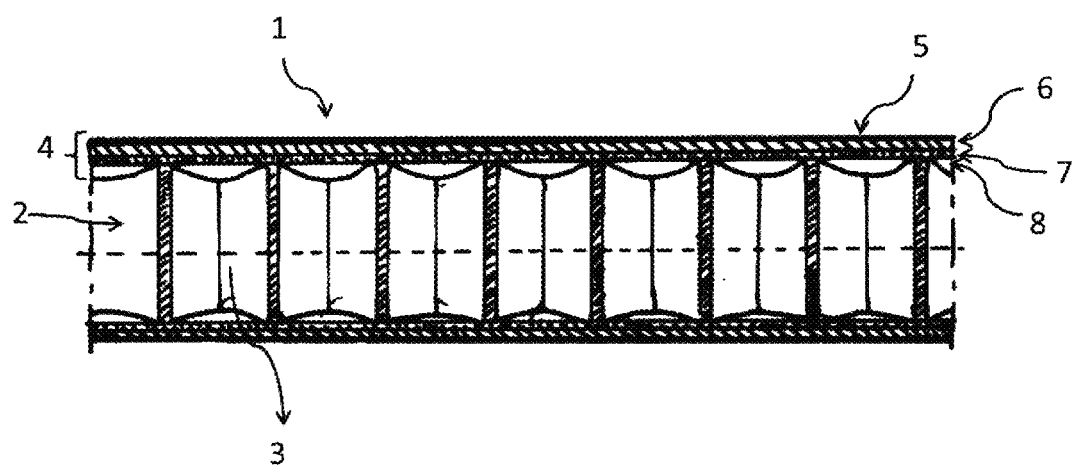
FIGS. 2 and 3 Schematic layout of the material layers in the final product.
Figure 3:
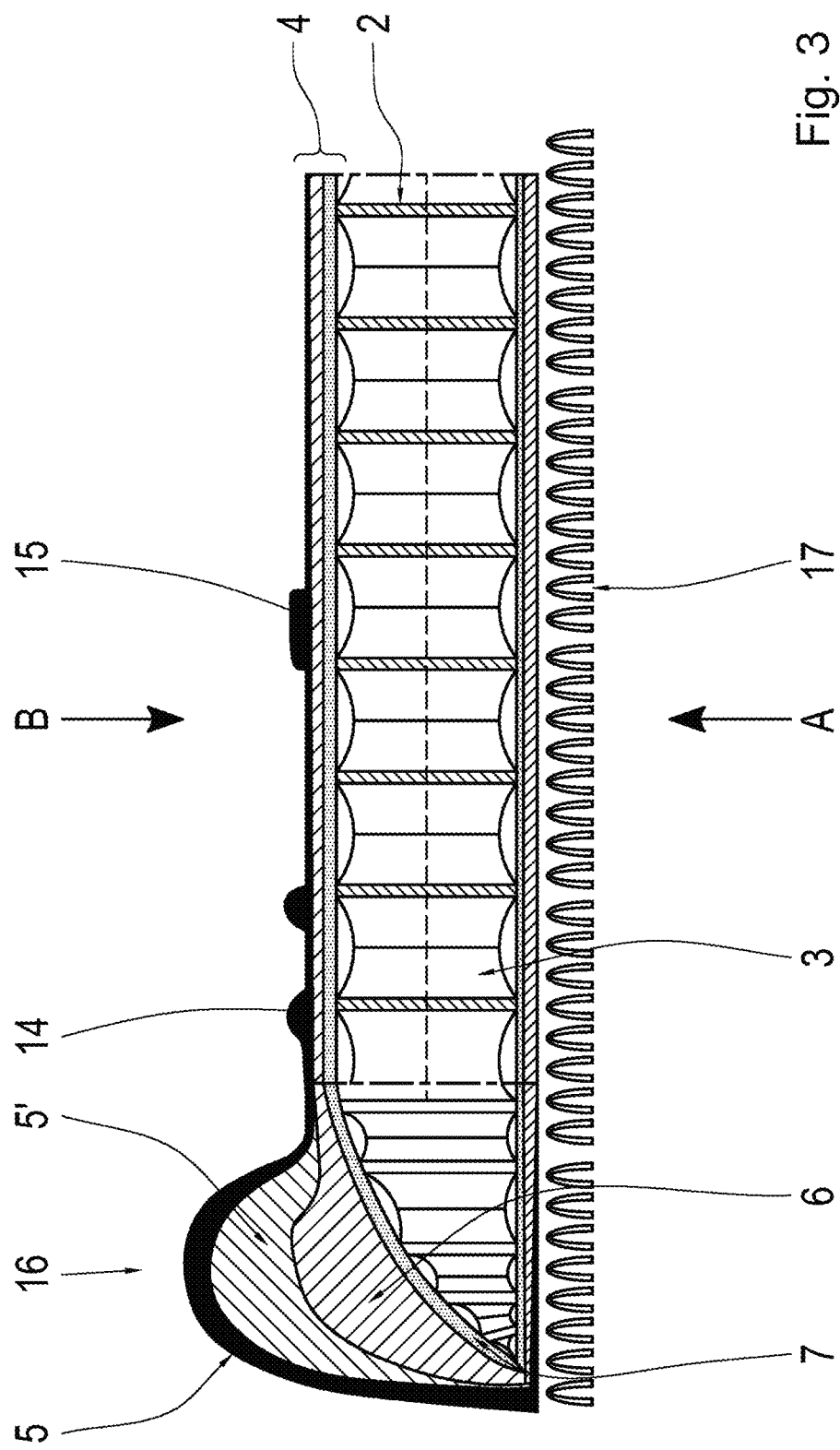

FIGS. 2 and 3 are showing example cross sections of sandwich panels (1) according to the invention with a honeycomb core layer (2) with chambers 3 which form open channels between both surfaces of the core layer. The walls of the channels can be formed from different materials such as but not limited to paper, cardboard or plastics material like polyolefin, polypropylene, polyethylene or polyester based materials as well as composite materials made of natural fibers and thermoplastics.

Although the core layer depicted is a honeycomb other grid forms might be used such as tubular, corrugated or closed cell foam.

The core material is preferably covered on both sides with a fibrous reinforcement layer (7) to form a sandwich, although the covering layers between the sides might vary, they must be even in their tensile strength performance under thermal conditions to prevent warping of the part.

FIG. 3 shows an example of a side coverage (4) associated with one side of the core layer (2) that consists of the fibrous reinforcement layer (7) fully penetrated by wet polyurethane foam and a resilient polyether slab foam layer (6), which is penetrated and engulfed by the wet polyurethane foam. The wet polyurethane foam will eventually form a skin layer (5) on top of the polyether polyurethane foam layer as the layers of the sandwich panel are compressed. Compression will also urge a small amount of the wet polyurethane foam into the top of the open channels of the core layer's honeycomb core material (8). Further compression will bulge a portion of the resilient polyether slab foam layer (6) into a recess in a compression mold that is covered by wet polyurethane foam that is less dense than the polyurethane foam of the compressed skin layer, thereby forming a dense skin and an overall strong structural layer.

The thus bound layers form together a strong sandwich that can bear high loads on its surface without bending or sagging substantially.

The construction of FIG. 2 can be used in many different applications and due to the use of the polyether polyurethane foam on one or both sides it is possible to use the board without any covering layer. The fibrous structure of the fibrous mats particularly when they are glass fiber mats is no longer visible and possible damaging of the surface will no longer free the fiber content.

Part of the use of the board as load floor or flooring panel in the passenger compartment, it can now also be used as a floor panel in a frunk—a front storage space in an electric vehicle.

It is also possible to use the panel as a battery cover or computer panel or box, as the material is very light in weight but has a high stiffness and impact protection. If needed the panel can be locally further enforced with metal beams or plates to further enhance the crash protection. It is also possible to introduce crash break lines within the core to enable crash zones if needed.

FIG. 3 also shows a preferred example of a panel according to the invention build up as a reversed load floor, for instance like depicted in FIG. 1. The main layout and numbering is the same as in FIG. 2. However here the reversible load floor has an A-Surface (A) and a B-surface (B) both surfaces good enough to form an A quality surface but with different functions.

The A-surface in this case is the classical carpet surface with a tufted carpet (17) laminated on the molded part.

The B-surface is now formed by the dense polyurethane skin whereby the surface contains embellishments in the form of a raised pattern on the surface of the part with knobs (14) and ribs (15) mainly filled by the polyurethane skin material. In addition the surface contains a raised rim (16) at the edge of the part whereby the raised rim is mainly formed by the polyether polyurethane foam layer (6 not to scale) that rebounds pushing the polyurethane foam (5 and 5') back into the recess in the mold, in addition the foam further fills the space forming a dense foam (5') and even denser skin (5) on the foam resulting in a durable rim.

Figure 4:
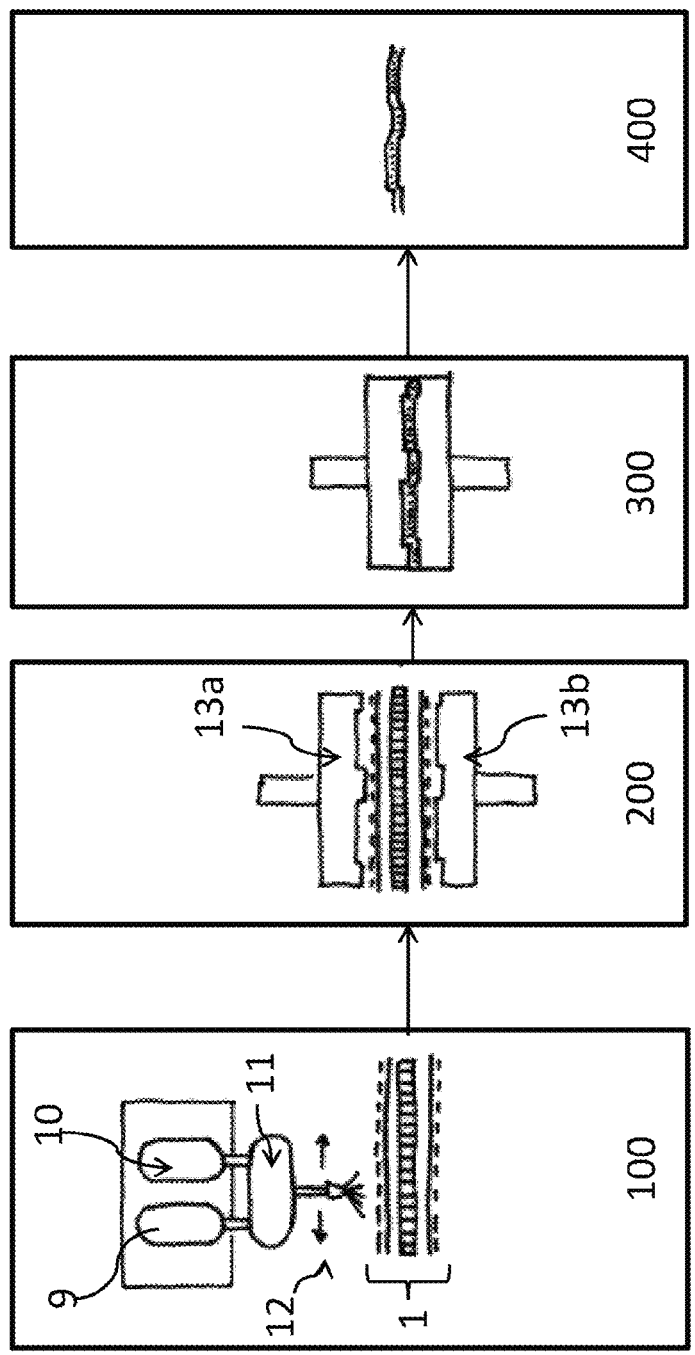
FIG. 4 schema of the production of a part according to the invention.

FIG. 4 is schematically showing the main steps in a preferred production process for the sandwich panel according to the invention with step Wetting of the material layers with the polyurethane mixture on both sides (100) in particular by putting the materials 1 in order underneath or opposite one or more polyurethane spray heads 12 that can move in relation to the surface to be covered. The polyurethane may be mixed and dosed immediately before spraying for instance using a first dosing system for the isocyanate (9) and a second dosing system for the polyol (10) into a mixing unit 11. Additives might be added to the stock or directly to the mixing unit;

Transferring the thus wetted material stack inside a heated mold (200) with a first and second mold half 13*a* and *b*, that can be closed together to form the final part;

Thermo-compression molding the part (300) by closing the mold and keeping it closed under pressure. The heat of the mold will (further) activate the polyurethane mixture creating a foam pressure that will help spreading the mixture through the layers as well as forming a skin on the surface of the part;

Unmolding the part (400).

After the unmolding additional surface layers like a carpet layer can be put on top of at least one surface to form a surface with a nice soft surface. For instance a tufted or nonwoven carpet layer or a fabric, like a neoprene fabric might be used. Preferably a small recess is made in the panel to obtain a plain level with the top of the carpet surface when positioned.

As an additional step also other appliances can be attached to the part like for instance handles, hinges etc. depending on the part and function.

The invention claimed is:

1. A sandwich panel for use in a vehicle comprising:
a core layer comprising a honeycomb board that is covered on both sides with a fibrous layer such that a sandwich stack is formed;
a resilient slab foam layer having an open cell structure and comprising polyether polyurethane connected to an outer surface of the fibrous layer;
a polyurethane layer comprising a skin layer and a dense foam that is formed by applying a wet polyurethane-forming mixture to the resilient slab foam layer such that the mixture engages with the resilient slab foam layer, wherein a portion of the wet polyurethane-forming mixture is urged under pressure to impregnate and extend through the resilient slab foam layer and to embed fibers of the fibrous layer on both sides of the core, whereby the wet polyurethane-forming mixture bulges inside the core layer to bind adjacent layers to the core layer without fully filling the core layer; and
wherein the skin layer and the dense foam are positioned on an outer surface of the resilient slab foam layer that is not in contact with the fibrous layer such that the skin layer is not in contact with the fibrous layer;
wherein the dense foam is positioned between the skin layer and a portion of the resilient slab foam layer; and
wherein the skin layer consists of condensed polyurethane formed from the wet polyurethane-forming mixture and has a density that is greater than the density of the dense foam layer.

2. The sandwich panel according to claim 1 whereby the resilient slab foam layer has a surface weight of between 48 to 240 gsm.

3. The sandwich panel according to claim 1, whereby the sandwich panel is formed in a mold having a recessed portion that accommodates the dense foam, wherein a portion of the resilient slab foam layer positioned adjacent to the dense foam is thicker than portions of the resilient slab foam layer that were not placed inside of the recessed portion during molding.

4. The sandwich panel according to claim 1, whereby the polyurethane used to impregnate fibers of the fibrous layer has an area weight of between 200 and 2000 gsm.

5. The sandwich panel according to claim 1, whereby the fibrous layer is comprised of a first fibrous mat and a second fibrous mat can be made up of the same or different fibers, fiber mixtures, or fibrous layers.

6. The sandwich panel according to claim 5, whereby the first and/or second fibrous mat comprises at least one of inorganic fibers, synthetic fibers, aramid fibers, polyamide fibers, polyolefin fibers, organic regenerated fibers, natural fibers, animal fibers, and a mixture of one or more thereof.

7. The sandwich panel according to claim 5, whereby the first and/or second fibrous mat has an area weight of between 100 and 900 gsm.

8. The sandwich panel according to claim 1, whereby the core layer is made from plastic, a natural material, an inorganic material, a combination of natural fibers and a resin, aramid, or a metal.

9. The sandwich panel according to claim 1, whereby the core layer is a honeycomb board with a cell diameter of between 4 and 10 mm.

10. The sandwich panel according to claim 1, whereby the core layer is polyester closed cell foam board with a density of between 60 and 200 kg/m3.

11. The sandwich panel according to claim 1, whereby the thickness of the core layer is between 2 and 30 mm.

12. The sandwich panel according to claim 1, wherein at least one surface of the skin layer comprises raised protrusions in the form of knobs, waves, or embellishments, surface patterning similar to wood or leather graining, stiffening ribs, or beams.

13. The sandwich panel according to claim 1, further comprising additional layers laminated to at least one surface fully or locally, chosen from a tufted carpet, a nonwoven carpet, knitted layer, foil layer, foamed, spray or RIM skin layer, a foil, a film, a scrim layer, a logo, or anti-sliding pad.

14. The sandwich panel according to claim 1, further comprising an in-mold coating of at least one surface skin layer fully or partially covering the surface comprising one of an aesthetic coating, a coating impervious to water and/or grease, a thermal conductive coating, an electro conductive coating, or electro-magnetic shielding coating.

15. A process for producing a sandwich panel according to claim 1 comprising:
providing a sandwich stack comprising a core layer comprised of honeycomb board and fibrous layers in contact with both sides of the core layer such that a sandwich stack is formed;
providing a resilient slab foam layer having an open cell structure and comprising polyether polyurethane connected to an outer surface of the fibrous layers;
wetting the sandwich stack by wetting the resilient slab foam layer with a polyurethane-forming mixture that includes a foam stabilizer;
placing the wetted sandwich stack in a compression mold and closing the compression mold;
maintaining the mold at a temperature in the range between 40° and 200° C. to mold the wetted sandwich stack and to harden the polyurethane-forming mixture and thereby forming a molded part with a dense outer skin and a dense foam formed of the polyurethane-forming mixture that does not contact with the fibrous layers, whereby polyurethane of the polyurethane-forming mixture travels through the resilient slab foam layer and embeds fibers fibrous layers and binds the fibrous layers to the core layer;
removing a molded article from the compression mold;
wherein the dense foam is positioned between the skin layer and a portion of the resilient slab foam layer; and
wherein the skin layer consists of condensed polyurethane formed from the wet polyurethane-forming mixture and has a density greater than the density of the dense foam layer.

16. The sandwich panel according to claim 1, wherein the sandwich panel is a load floor panel, a main floor panel for a passenger compartment, a roof module, a bonnet, a tailgate module, a door module, a floor panel module, a parcel shelf, a spare wheel cover, an interior trim component, a battery or battery pack cover, a computer or battery box, or a partitioning panel.

17. The sandwich panel according to claim 6,
wherein the inorganic fibers comprise glass, carbon, or basalt fibers;
wherein the synthetic fibers comprise polyester;
wherein polyolefin comprises polyethylene or polypropylene;
wherein the organic regenerated fibers comprise viscose, rayon, or modal fibers;
wherein the natural fibers comprise hemp, flax, kenaf, bamboo or other cellulose fibers; and
wherein the animal fibers comprise wool fibers.

18. The sandwich panel according to claim 8,
wherein the plastic comprises polyethylene terephthalate (PET), polybutylene terephthalate (PBT), polyamide, polypropylene, polyethylene, a polylactic based material, polyether ether ketone (PEEK), polycarbonate; and
wherein the natural material is paper or cardboard.

* * * * *